L. A. SHELDON.
METERING FLUIDS WHICH HAVE AN INTERMITTENT FLOW.
APPLICATION FILED OCT. 9, 1914.
1,195,105.  Patented Aug. 15, 1916.
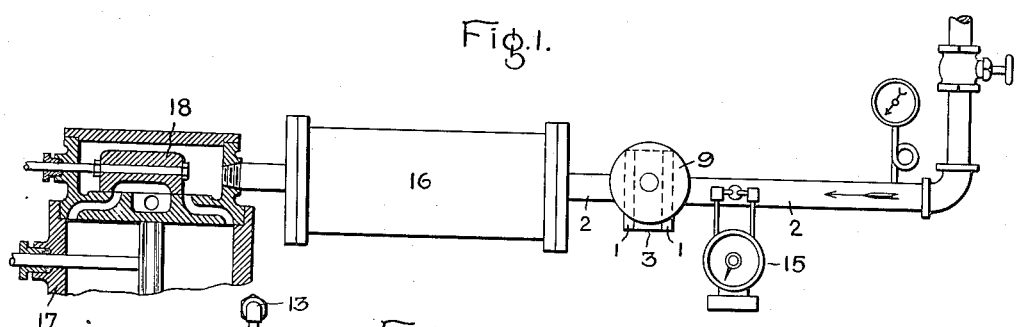
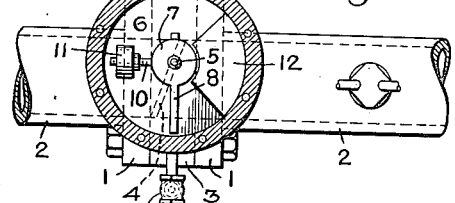
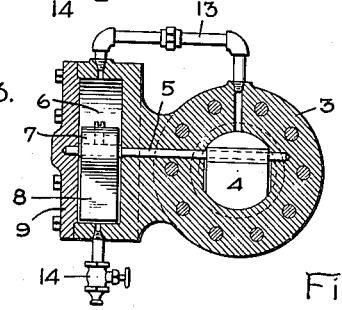
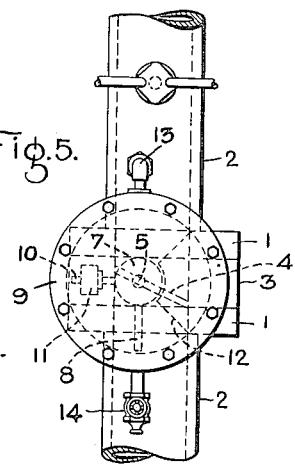
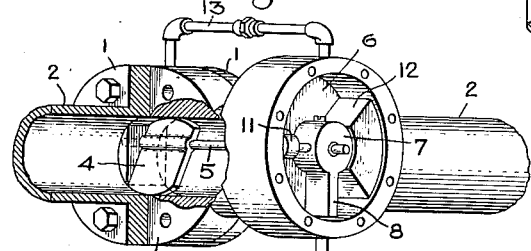
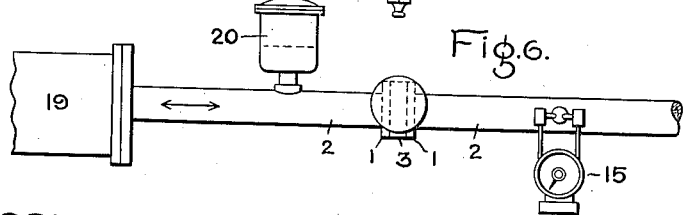
Witnesses:
Inventor:
Lucian A. Sheldon
by
His Attorney

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

METERING FLUIDS WHICH HAVE AN INTERMITTENT FLOW.

1,195,105.  Specification of Letters Patent.  Patented Aug. 15, 1916.

Application filed October 9, 1914. Serial No. 865,834.

*To all whom it may concern:*

Be it known that I, LUCIAN A. SHELDON, a citizen of the United States, residing at Schenectady, county of Schenectady, State of New York, have invented certain new and useful Improvements in Metering Fluids Which Have an Intermittent Flow, of which the following is a specification.

This invention relates to the measuring of the quantity of fluid flowing through a conduit in a given time. Instruments for effecting and recording such measurements have been devised and are in successful use; for example, the flow meter or manometer forming the subject matter of the patent to A. R. Dodge No. 1,118,403 patented November 24, 1914. But in order to insure correct operation and accurate results by the use of such meters, it is necessary that the flow of fluid be relatively steady. Fluctuations of considerable magnitude introduce grave errors, sometimes as great as 300 per cent. Such fluctuations may arise from a variety of causes, as, for example, the opening and closing of the valves admitting steam to a reciprocating engine.

My invention aims to overcome the trouble due to fluctuations in the flow of the fluid and to insure an accurate measurement of the intermittent flow by the meter whatever may be the irregularity in the fluid column beyond it.

The invention comprises the combination with a flow meter or manometer of a reducing valve and a receiver placed between the meter and the cause of fluctuating flow. The reducing valve has a dash pot or other means for steadying it, and is set to give but a slight drop in pressure, say two pounds; automatically maintaining this drop constant for all flows. The receiver must be at least of such size that, with the drop in pressure effected by the reducing valve, there will be enough increase in volume in the fluid to furnish sufficient steam or other fluid for one admission. This combination, if properly proportioned, will give practically steady flow at the meter. Since too large a receiver volume does no harm, it is only necessary to have the receiver large enough for the greatest demand upon it and it will take care of all other demands.

In the accompanying drawings, Figure 1 is a diagrammatic representation of an installation embodying my invention for measuring an intermittent flow of steam, or other elastic fluid; Fig. 2 is a side elevation of the regulator partly in section; Fig. 3 is a cross-section of the regulator; Fig. 4 is a perspective view of it, partly in section; Fig. 5 shows the regulator applied to an upright main, and Fig. 6 shows an installation for measuring the flow of water or the like.

The reducing valve is preferably built so that it can be inserted between two flanges 1 on abutting sections of the conduit 2. It comprises a casting 3 having a passage through it which registers with the interior of the conduit. In this passage is located a butterfly valve 4 mounted on a spindle 5, which extends axially through a cylindrical chamber 6 in the casting. Within the chamber, and secured to the spindle, is a hub 7, which carries a radial vane 8 fitting easily the inner surfaces of the chamber and the inside of its cover 9. An arm 10 projects from the hub at right angles to the vane and carries a counter-balancing weight 11, which is adjustable along said arm. A wide partition 12 partly fills the chamber on the side opposite the arm 10, its inner end standing close to the hub 7. A pipe 13 connects the top of the chamber 6 with the passage through the casting 3. A drainage pet cock 14 is inserted in the bottom of the chamber 6. When used in a steam main, this reducing valve is opened by the pressure of the steam flowing through the conduit in the direction of the arrow in Fig. 1. The amount of opening, and consequently the drop in pressure through the valve, is determined by the radial distance of the weight 11 from the axis of the spindle 5. The chamber 6 becomes filled with water of condensation from the steam entering it through the pipe 13, so that the vane 8 acts as a dash pot to dampen the movements of the valve and prevent it from responding to slight momentary fluctuations in steam flow.

The flow meter 15 is of any suitable design, though I prefer to use the Dodge meter above referred to. It is connected to the conduit 2 in advance of the reducing valve; that is, on the side of higher pressure. After passing the meter and the reducing valve, the steam enters the receiver 16. This may be simply a long section of conduit, the same size as that in which the reducing valve is inserted; but in such a case a considerable length of conduit would be required, in order to afford sufficient volume of steam, so for the sake of compactness I prefer to use a shorter section of much larger diameter, as shown. The engine 17 draws its intermittent supply of steam from the receiver. The quantity of steam in the receiver is, therefore, constantly varying with the opening and closing of the engine admission valve 18, but if the capacity of the receiver is sufficient to permit this variation without causing the pressure to build up to that in the conduit behind the reducing valve, the flow through the reducing valve will be steady, being due to the fixed drop in pressure caused by said valve.

The proper capacity of the receiver in cubic feet may be found by the formula,—

$$R = \frac{FV_1V_m}{A(V_2-V_1)} \times (1-C)$$

where F is the flow of steam in pounds per minute; A is the number of admissions of steam to the engine per minute; C is the cut-off corresponding to the flow; $V_1$ is the specific volume at maximum pressure in the receiver; $V_2$ is the specific volume at minimum pressure in the receiver, and $V_m$ is the specific volume at mean pressure in the receiver. Tests with receivers of different capacities, steam at different pressures, varying drops across the regulating valve and with different cut-offs, all give results which agree very closely with the foregoing formula. While the pressure fluctuated several pounds at each opening and closing of the engine valves, the pressure at the meter varied only very slightly, with a corresponding steadiness of flow. The volume of the receiver must increase directly as the flow. For example, it should be, roughly speaking, about one cubic foot for every ten pounds of flow per minute at 200 R. P. M. of the engine, when the boiler pressure is one hundred pounds, the drop in pressure through the reducing valve is four pounds, and the cut-off one quarter.

The reducing valve must in every case be placed between the meter and the cause of the intermittent flow. Fig. 6 shows the arrangement for incompressible fluids, such as water delivered from a pump 19. An air chamber 20 forms the receiver in these installations to compensate for the variations in volume of liquid.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is:—

1. The combination with a conduit having means connected therewith which produces an intermittent flow of fluid therethrough, of a flow meter for metering the fluid, a reducing valve between said flow meter and said means, and a receiver between the reducing valve and said means, said receiver having a fixed volumetric capacity.

2. Means for metering an intermittent flow of fluid in a conduit, comprising the combination with said conduit of a device taking fluid from said conduit intermittently, a flow meter, a reducing valve in said conduit between said meter and said device and causing a drop in pressure and a consequent increase in volume sufficient to furnish fluid enough for one admission, and a receiver of fixed capacity between said valve and said device said capacity being sufficient to accommodate said increased volume of fluid.

3. Means for metering an intermittent flow of fluid in a conduit, comprising the combination with said conduit, of a device causing variations in the volume of fluid flowing in said conduit, a flow meter, an automatic reducing valve causing a drop in pressure between said meter and said device, and a receiver of fixed capacity between said valve and said device large enough to store the increased volume of fluid due to the drop in pressure.

4. Means for metering an intermittent flow of fluid in a conduit, comprising a device taking a given volume of fluid intermittently, a flow meter, an automatic reducing valve between said meter and said device effecting a drop in pressure and an increase of volume of said fluid, and a receiver of fixed capacity between said valve and said device large enough to store the increased volume of the fluid in the intervals when the device is not taking fluid.

5. The combination with a conduit for fluids, of means causing an intermittent flow of said fluid, a meter for measuring the flow, a receiver, and a reducing valve between the meter and the receiver, comprising a casting having a passage for the fluid, a butterfly valve in said passage, and a weighted arm on the spindle of said valve.

6. The combination with a conduit for fluids, of means causing an intermittent flow of said fluid, a meter for measuring the flow, a receiver, and a reducing valve between the meter and the receiver, comprising a casting having a passage for the fluid, a butterfly valve in said passage, a weighted arm on the spindle of said valve, and a dash pot to dampen said valve.

7. The combination with a conduit for fluids, of means causing an intermittent flow of said fluid, a meter for measuring the flow, a receiver, and a reducing valve between the meter and the receiver, comprising a casting having a passage for the fluid, a butterfly valve in said passage, a weighted arm on the spindle of said valve, and a dash pot to dampen said valve comprising a chamber for collecting condensed steam, and a vane on the spindle of the valve working in said chamber.

8. The combination with a conduit having a means connected therewith which produces an intermittent flow therethrough, of a flow meter for metering the fluid, said flow meter including an element inserted in the conduit and upon which the fluid acts to create a pressure difference, a reducing valve between the meter and said means, and a receiver between the reducing valve and said means, said receiver having a fixed volumetric capacity.

In witness whereof, I have hereunto set my hand this 7th day of October, 1914.

LUCIAN A. SHELDON.

Witnesses:
BENJAMIN B. HULL,
HELEN ORFORD.